United States Patent
Chen (10) Patent No.: US 8,879,576 B2
(45) Date of Patent: Nov. 4, 2014

(54) METHOD AND APPARATUS FOR UNLICENSED BAND OPERATION

(75) Inventor: Tao Chen, Espoo (FI)

(73) Assignee: Broadcom Corporation, Irvine, CA (US)

( * ) Notice: Subject to any disclaimer, the term of this patent is extended or adjusted under 35 U.S.C. 154(b) by 20 days.

(21) Appl. No.: 13/327,225

(22) Filed: Dec. 15, 2011

(65) Prior Publication Data

US 2013/0156019 A1    Jun. 20, 2013

(30) Foreign Application Priority Data

Dec. 14, 2011 (GB) .................................. 1121434.3

(51) Int. Cl.
*H04J 3/00* (2006.01)
(52) U.S. Cl.
USPC .......................................... 370/468; 455/454
(58) Field of Classification Search
USPC ......... 370/216, 225, 228, 229, 230, 236, 310, 370/328, 329, 345, 464, 465, 468, 478, 490, 370/522; 455/450, 451, 452.1, 452.2, 454, 455/455, 550.1, 552.1
See application file for complete search history.

(56) References Cited

U.S. PATENT DOCUMENTS

| | | | | |
|---|---|---|---|---|
| 2002/0122405 A1* | 9/2002 | Liang | ............................ | 370/344 |
| 2004/0028011 A1* | 2/2004 | Gehring et al. | ............... | 370/330 |
| 2008/0125128 A1 | 5/2008 | Yoo et al. | | |
| 2009/0233554 A1* | 9/2009 | Cordeiro et al. | ............. | 455/63.1 |
| 2012/0164948 A1* | 6/2012 | Narasimha et al. | .......... | 455/63.1 |
| 2012/0207040 A1* | 8/2012 | Comsa et al. | ................. | 370/252 |

FOREIGN PATENT DOCUMENTS

WO    WO 2010/146238 A1    12/2010

OTHER PUBLICATIONS

Search Report from Great Britain Application No. GB1121434.3, dated Apr. 5, 2012.

* cited by examiner

*Primary Examiner* — Edan Orgad
*Assistant Examiner* — Curtis A Alia
(74) *Attorney, Agent, or Firm* — Stanton IP Law (57) ABSTRACT

A method, apparatus and computer program product are provided in order to enable operation of both cellular and WLAN on a shared unlicensed band. In this regard, a method is provided that includes causing a primary transmission mode period of operation, a secondary transmission mode period of operation, and an idle mode period of operation on an unlicensed frequency band to be transmitted to a mobile terminal. The method further includes receiving an interfered ratio report from the mobile terminal. The method also includes causing the mobile terminal to be classified as at least one of a primary user or a secondary user based on the interfered ratio report. The method also includes causing the classification to be transmitted to the mobile terminal.

19 Claims, 6 Drawing Sheets

ID AND APPARATUS FOR
UNLICENSED BAND OPERATION

TECHNOLOGICAL FIELD

Embodiments of the present invention relate generally to communications technology and, more particularly, to communications on an unlicensed band.

BACKGROUND

Due to a scarcity of wireless resources and the increasing traffic on the currently available wireless networks, use of unlicensed bands for cellular communications is becoming more popular. Some of the unlicensed bands are currently being used by other wireless mediums, such as wireless local area networks (WLAN). WLAN networks may be interfered with or may cause interference to cellular networks in an instance in which cellular networks attempt to utilize the unlicensed bands. Since the WLAN devices that are currently operating on these networks are unlicensed, a particular operator or provider does not own the spectrum and thus cannot prohibit and/or regulate use of an unlicensed band by other operators and/or devices.

BRIEF SUMMARY

A method, apparatus and computer program product are therefore provided according to some example embodiments in order to enable operation of both cellular (e.g. long term evolution (LTE) networks) and WLAN on a shared unlicensed band. In particular several operation modes are described according some example embodiments of the current invention. The operations modes include a primary mode, a secondary mode and an idle mode. In some example embodiments, a primary transmission mode enables the mobile terminal to operate normally without interference coordination with another user of an unlicensed band. In various example embodiments, a secondary transmission mode is configured to operate on predefined resources of the unlicensed band. In some example embodiments, an idle mode would not allow transmission on the unlicensed band.

In one embodiment, a method is provided that comprises causing a primary transmission mode period of operation, a secondary transmission mode period of operation, and an idle mode period of operation on an unlicensed frequency band to be transmitted to a mobile terminal. The method of this embodiment may also include receiving an interfered ratio report from the mobile terminal. In some example embodiments the interfered ratio is calculated as a total number of interfered symbols over a sensing period. The method of this embodiment may also include causing the mobile terminal to be classified as at least one of a primary user or a secondary user based on the interfered ratio report. The method of this embodiment may also include causing the classification to be transmitted to the mobile terminal. In some example embodiments the mobile terminal is configured to operate during the primary transmission mode period of operation, the secondary transmission mode period of operation, and the idle mode period of operation based on the classification.

In another embodiment, an apparatus is provided that includes at least one processor and at least one memory including computer program code with the at least one memory and the computer program code being configured, with the at least one processor, to cause the apparatus to at least cause a primary transmission mode period of operation, a secondary transmission mode period of operation, and an idle mode period of operation on an unlicensed frequency band to be transmitted to a mobile terminal. The at least one memory and computer program code may also be configured to, with the at least one processor, cause the apparatus to receive an interfered ratio report from the mobile terminal. In some example embodiments the interfered ratio is calculated as a total number of interfered symbols over a sensing period. The at least one memory and computer program code may also be configured to, with the at least one processor, cause the apparatus to cause the mobile terminal to be classified as at least one of a primary user or a secondary user based on the interfered ratio report. The at least one memory and computer program code may also be configured to, with the at least one processor, cause the apparatus to cause the classification to be transmitted to the mobile terminal. In some example embodiments the mobile terminal is configured to operate during the primary transmission mode period of operation, the secondary transmission mode period of operation, and the idle mode period of operation based on the classification.

In the further embodiment, a computer program product may be provided that includes at least one non-transitory computer-readable storage medium having computer-readable program instruction stored therein with the computer-readable program instructions including program instructions configured to cause a primary transmission mode period of operation, a secondary transmission mode period of operation, and an idle mode period of operation on an unlicensed frequency band to be transmitted to a mobile terminal. The computer-readable program instructions may also include program instructions configured to receive an interfered ratio report from the mobile terminal. In some example embodiments the interfered ratio is calculated as a total number of interfered symbols over a sensing period. The computer-readable program instructions may also include program instructions configured to cause the mobile terminal to be classified as at least one of a primary user or a secondary user based on the interfered ratio report. The computer-readable program instructions may also include program instructions configured to cause the classification to be transmitted to the mobile terminal. In some example embodiments the mobile terminal is configured to operate during the primary transmission mode period of operation, the secondary transmission mode period of operation, and the idle mode period of operation based on the classification.

In yet another embodiment, an apparatus is provided that includes means for causing a primary transmission mode period of operation, a secondary transmission mode period of operation, and an idle mode period of operation on an unlicensed frequency band to be transmitted to a mobile terminal. The apparatus of this embodiment may also include means for receiving an interfered ratio report from the mobile terminal. In some example embodiments the interfered ratio is calculated as a total number of interfered symbols over a sensing period. The apparatus of this embodiment may also include means for causing the mobile terminal to be classified as at least one of a primary user or a secondary user based on the interfered ratio report. The apparatus of this embodiment may also include means for causing the classification to be transmitted to the mobile terminal. In some example embodiments the mobile terminal is configured to operate during the primary transmission mode period of operation, the secondary transmission mode period of operation, and the idle mode period of operation based on the classification.

In one embodiment, a method is provided that comprises receiving an operation mode indication. In some example embodiments the operation mode indication comprises an indication of a primary transmission mode period of operation, a secondary transmission mode period of operation, and an idle mode period of operation on an unlicensed frequency band. The method of this embodiment may also include causing an interfered ratio report to be transmitted. In some example embodiments the interfered ratio is calculated as a total number of interfered symbols over a sensing period. The method of this embodiment may also include determining whether to operate as at least one of a primary user or a secondary user based on the interfered ratio report. The method of this embodiment may also include determining whether to operate during the primary transmission mode period of operation, the secondary transmission mode period of operation, and the idle mode period of operation.

In another embodiment, an apparatus is provided that includes at least one processor and at least one memory including computer program code with the at least one memory and the computer program code being configured, with the at least one processor, to cause the apparatus to at least receive an operation mode indication. In some example embodiments the operation mode indication comprises an indication of a primary transmission mode period of operation, a secondary transmission mode period of operation, and an idle mode period of operation on an unlicensed frequency band. The at least one memory and computer program code may also be configured to, with the at least one processor, cause the apparatus to cause an interfered ratio report to be transmitted. In some example embodiments the interfered ratio is calculated as a total number of interfered symbols over a sensing period. The at least one memory and computer program code may also be configured to, with the at least one processor, cause the apparatus to determine whether to operate as at least one of a primary user or a secondary user based on the interfered ratio report. The at least one memory and computer program code may also be configured to, with the at least one processor, cause the apparatus to determine whether to operate during the primary transmission mode period of operation, the secondary transmission mode period of operation, and the idle mode period of operation.

In the further embodiment, a computer program product may be provided that includes at least one non-transitory computer-readable storage medium having computer-readable program instruction stored therein with the computer-readable program instructions including program instructions configured to receive an operation mode indication. In some example embodiments the operation mode indication comprises an indication of a primary transmission mode period of operation, a secondary transmission mode period of operation, and an idle mode period of operation on an unlicensed frequency band. The computer-readable program instructions may also include program instructions configured to cause an interfered ratio report to be transmitted. In some example embodiments the interfered ratio is calculated as a total number of interfered symbols over a sensing period. The computer-readable program instructions may also include program instructions configured to determine whether to operate as at least one of a primary user or a secondary user based on the interfered ratio report. The computer-readable program instructions may also include program instructions configured to determine whether to operate during the primary transmission mode period of operation, the secondary transmission mode period of operation, and the idle mode period of operation.

In yet another embodiment, an apparatus is provided that includes means for receiving an operation mode indication. In some example embodiments the operation mode indication comprises an indication of a primary transmission mode period of operation, a secondary transmission mode period of operation, and an idle mode period of operation on an unlicensed frequency band. The apparatus of this embodiment may also include means for causing an interfered ratio report to be transmitted. In some example embodiments the interfered ratio is calculated as a total number of interfered symbols over a sensing period. The apparatus of this embodiment may also include means for determining whether to operate as at least one of a primary user or a secondary user based on the interfered ratio report. The apparatus of this embodiment may also include means for determining whether to operate during the primary transmission mode period of operation, the secondary transmission mode period of operation, and the idle mode period of operation.

BRIEF DESCRIPTION OF THE DRAWINGS

Having thus described the example embodiments of the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

A method, apparatus and computer program product of an example embodiment of the present invention are configured to enable operation of both cellular (e.g. long term evolution (LTE) networks) and WLAN on a shared unlicensed band. In particular several operation modes are described according some example embodiments of the current invention. The operations modes include a primary transmission mode, a secondary transmission mode and an idle transmission mode. In some example embodiments the operation modes may be transmitted by an access point or other network entity configured to cause signals to be transmitted to the mobile terminal. Alternatively or additionally, the access point, network entity or the like may broadcast a primary transmission mode and/or secondary transmission mode switching threshold to the mobile terminals that may allow a mobile terminal to determine operations modes without additional signaling with the access point, network entity or the like.

In some example embodiments, a primary transmission mode period of operation enables a mobile terminal to operate normally with no need of the interference coordination with another user of an unlicensed band. In some example embodiments, a WLAN device may be configured to determine that a mobile terminal is operating on the unlicensed band. For example, in cases where the mobile terminal is operating in the primary transmission mode, a WLAN device may suspend a transmission or continue a current transmission according to WLAN Carrier Sense Multiple Access (CSMA)/Collision Avoidance (CA) operation.

In various example embodiments, a secondary transmission mode is configured to operate on predefined resources of the unlicensed band. The mobile terminal may be configured to operate in the secondary transmission mode according to some example embodiments of the present invention. In the secondary transmission mode, the mobile terminal transmitting over the cellular system (e.g. LTE) may be scheduled on pre-defined limited resources and/or operate using limited power. In some example embodiments, the purpose of the secondary transmission mode is, for example, to limit interference to other WLAN devices operating on the unlicensed band, while enabling the transmission of data.

In some example embodiments, an idle mode of transmission would not allow a mobile terminal to conduct any transmissions. In some embodiments, this period of operation may allow the WLAN device to operate normally.

Figure 1:
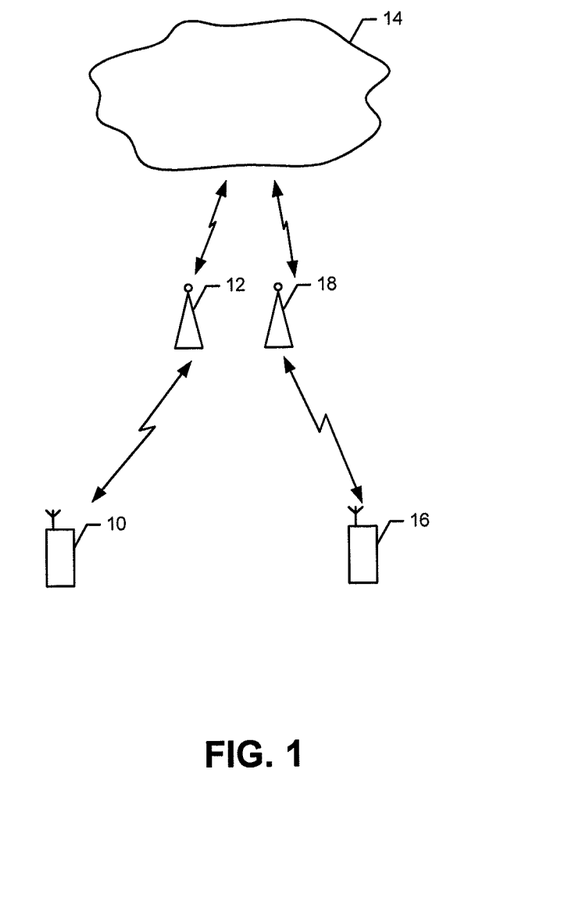
FIG. 1 is a schematic representation of a system having a mobile terminal that may operate on an unlicensed band and that may benefit from some example embodiments of the present invention.

Although the method, apparatus and computer program product may be implemented in a variety of different systems, one example of such a system is shown in FIG. 1, which includes a first communication device (e.g., mobile terminal 10) that is capable of communication via an access point 12, such as a base station, a Node B, an evolved Node B (eNB), serving cell or other access point, with a network 14 (e.g., a core network). While the network may be configured in accordance with LTE LTE-A, and/or the like, other networks may support the method, apparatus and computer program product of embodiments of the present invention including those configured in accordance with wideband code division multiple access (W-CDMA), CDMA2000, global system for mobile communications (GSM), general packet radio service (GPRS) and/or the like.

FIG. 1, also includes a second communication device (e.g., WLAN device 16) that is capable of communication via a base station 18, such as a wireless router, an access point, and/or the like, with a network 14 (e.g., a core network). While the network may be configured in accordance with WLAN and/or the like, other networks may support the method, apparatus and computer program product of embodiments of the present invention.

The network 14 may include a collection of various different nodes, devices or functions that may be in communication with each other via corresponding wired and/or wireless interfaces. For example, the network may include one or more cells, including access point 12, each of which may serve a respective coverage area. The serving cell and the neighbor cells could be, for example, part of one or more cellular or mobile networks or public land mobile networks (PLMNs). In turn, other devices such as processing devices (e.g., personal computers, server computers or the like) may be coupled to the mobile terminal 10 and/or other communication devices via the network.

A communication device, such as the mobile terminal 10 (also known as user equipment (UE)), may be in communication with other communication devices or other devices via the access point 12 and, in turn, the network 14. In some cases, the communication device may include an antenna for transmitting signals to and for receiving signals from a serving cell.

When referred to herein, a serving cell includes, but is not limited to a primary serving cell (PCell) and other serving cells such as secondary serving cells (SCell) that may be operating on an access point, such as access point 12. A candidate cell, target cell, neighbor cell and/or the like may also be used herein, and that includes a cell that is not currently a serving cell, but may become a serving cell in the future. A PCell, which may be embodied by an access point, generally includes, but is not limited to, a cell that is configured to perform initial establishment procedures, security procedures, system information (SI) acquisition and change monitoring procedures on the broadcast channel (BCCH) or data channel (PDCCH), and paging. The SCell, which may be embodied by a remote radio head (RRH) and is configured to provide additional radio resources to the PCell. In an embodiment, a "primary band" is the band that is indicated by the serving cell as the band of a serving carrier frequency. The secondary band is the band that is indicated by the serving cell as an additional band (e.g. in addition to primary band), that allows a mobile terminal radio frequency that is supported by the secondary band to also camp on the cell.

In some example embodiments, the mobile terminal 10 and/or the WLAN device 16 may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the mobile terminal 10 may include one or more processors that may define processing circuitry either alone or in combination with one or more memories. The processing circuitry may utilize instructions stored in the memory to cause the mobile terminal 10 to operate in a particular way or execute specific functionality when the instructions are executed by the one or more processors. The mobile terminal 10 and/or the WLAN device 16 may also include communication circuitry and corresponding hardware/software to enable communication with other devices and/or the network 14.

Figure 2:
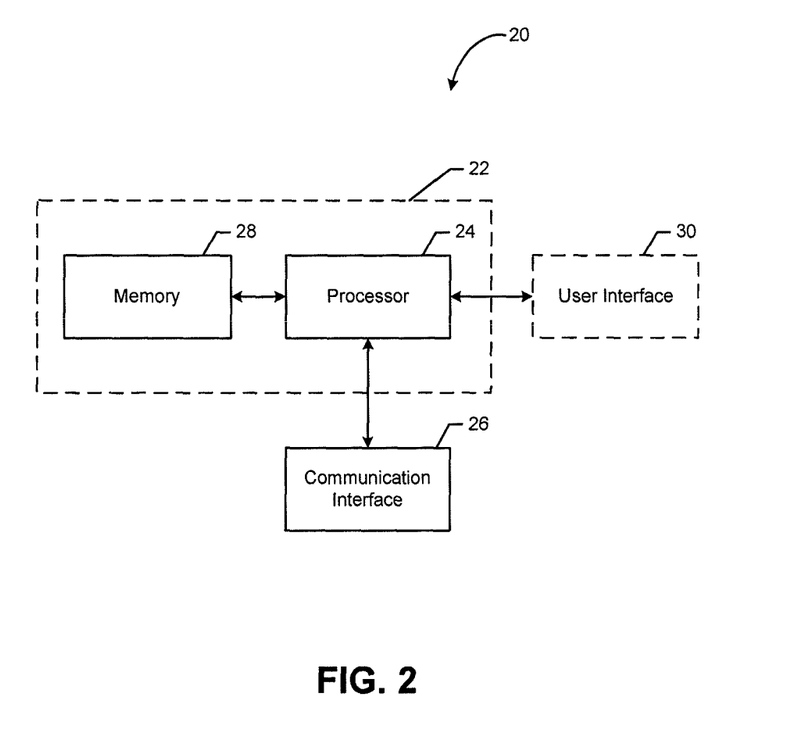
FIG. 2 is a block diagram of an apparatus that may be embodied by a mobile terminal in accordance with some example embodiments of the present invention.

In one embodiment, for example, the mobile terminal 10, the access point 12, the WLAN device 16, and/or the base station 18 may be embodied as or otherwise include an apparatus 20 as generically represented by the block diagram of FIG. 2. While the apparatus 20 may be employed, for example, by a mobile terminal 10 or an access point 12, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 28 that may be in communication with or otherwise control a communication interface 26 and, in some cases, a user interface 30. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal 10, the processing circuitry may be embodied as a portion of a mobile computing device or other mobile terminal.

The user interface 30 (if implemented) may be in communication with the processing circuitry 22 to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms. The apparatus 20 need not always include a user interface. For example, in instances in which the apparatus is embodied as an access point 12 and/or a base station 18, the apparatus may not include a user interface. As such, the user interface is shown in dashed lines in FIG. 2.

The communication interface 26 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network 14 and/or any other device or module in communication with the processing circuitry 22, such as between the mobile terminal 10 and the access point 12 or between the WLAN device 16 and the base station 18. In this regard, the communication interface 26 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 28 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 28 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Referring again to FIG. 1, the access point 12 may be configured to classify, such as by the processing circuitry 22, the processor 24 and/or the like, a mobile terminal 10 as a primary user and/or secondary user. In some example embodiments the mobile terminal classified as a primary user may operate on both the primary transmission mode and/or the secondary transmission mode. A mobile terminal classified as a secondary user, in some example embodiments, may be configured to transmit/receive during the secondary transmission mode only.

In various example embodiments, a network entity, such as the access point 12, may be configured to determine, such as by the processing circuitry 22, the processor 24 and/or the like, the primary transmission mode, the secondary transmission mode, and the idle mode periods of operation. In order to determine such periods, the access point 12 may receive measurement reports from the mobile terminal 10. For example, a mobile terminal operating as a secondary user may measure, such as by the processing circuitry 22, the processor 24 and/or the like, WLAN interference levels on resources which are not predefined for data transmission during a secondary transmission mode (e.g. passive sensing). By way of further example, a mobile terminal operating as a primary user may also measure a blocker error rate (BLER) in order to determine and/or report WLAN interference levels (e.g. active sensing).

In some example embodiments, an access point 12 may receive an interfered ratio report from the mobile terminal 10. In some example embodiments, the received interfered ratio report may be defined as a ratio of the number of symbols suffering WLAN interference over a sensing period (e.g. 1 ms or 14 symbols). For example, during 1 symbol and in an instance in which an interference level is higher than a sensing threshold, a corresponding symbol is counted as the interfered symbol. For example, the interfered ratio may be calculated as the total number of interfered symbols over 14 symbols.

In some example embodiments, the interfered ratio report may be calculated by each mobile terminal during the secondary transmission mode and idle period. Moreover, according to the measurement report and the interfered ratio report a mobile terminal may be designated as a primary user or a secondary user. For example, a mobile terminal with 10% interfered ratio may be configured as the primary user whereas a mobile terminal with 90% interfered ratio may be configured as the secondary user.

Based on the distribution of the interfered ratio in the time and spatial domain, access point 12 may determine, such as by the processing circuitry 22, the processor 24, the communications interface 26 and/or the like, the load or activity level of a WLAN and the distribution of the affected mobile terminals. For example, if there is a peak in the time domain for the interfered ratio it may indicate that the WLAN is in a fractional load. Access point 12 may also derive, such as by the processing circuitry 22, the processor 24 and/or the like, the average back off time of the WLAN system. If a warming up period (e.g. back off time) is getting longer, it may indicate access point 12 should spare more time for a WLAN transmission and may be used to derive the reasonable primary transmission mode, secondary transmission mode and idle mode periods.

Alternatively or additionally, if there is no peak in the time domain but an interfered ratio is higher than a predetermined level, it may indicate a fully loaded WLAN. In this case, the idle mode period of operation may be adjusted with a longer period whereas the primary transmission mode duration may be shortened to account for the increased activity.

Alternatively or additionally, if the interfered ratio is lower than a predetermined level, it may indicate that WLAN has a low load and a peak that may be considered as the beacon signal transmission of WLAN. Then access point 12 may reduce transmissions during the beacon signal transmission period. Advantageously, for example, the coupling of the mode transition with the enhanced measurement may provide the basic synchronization between systems as well as fully utilizes the WLAN recovery period for the data transmission.

Figure 3:
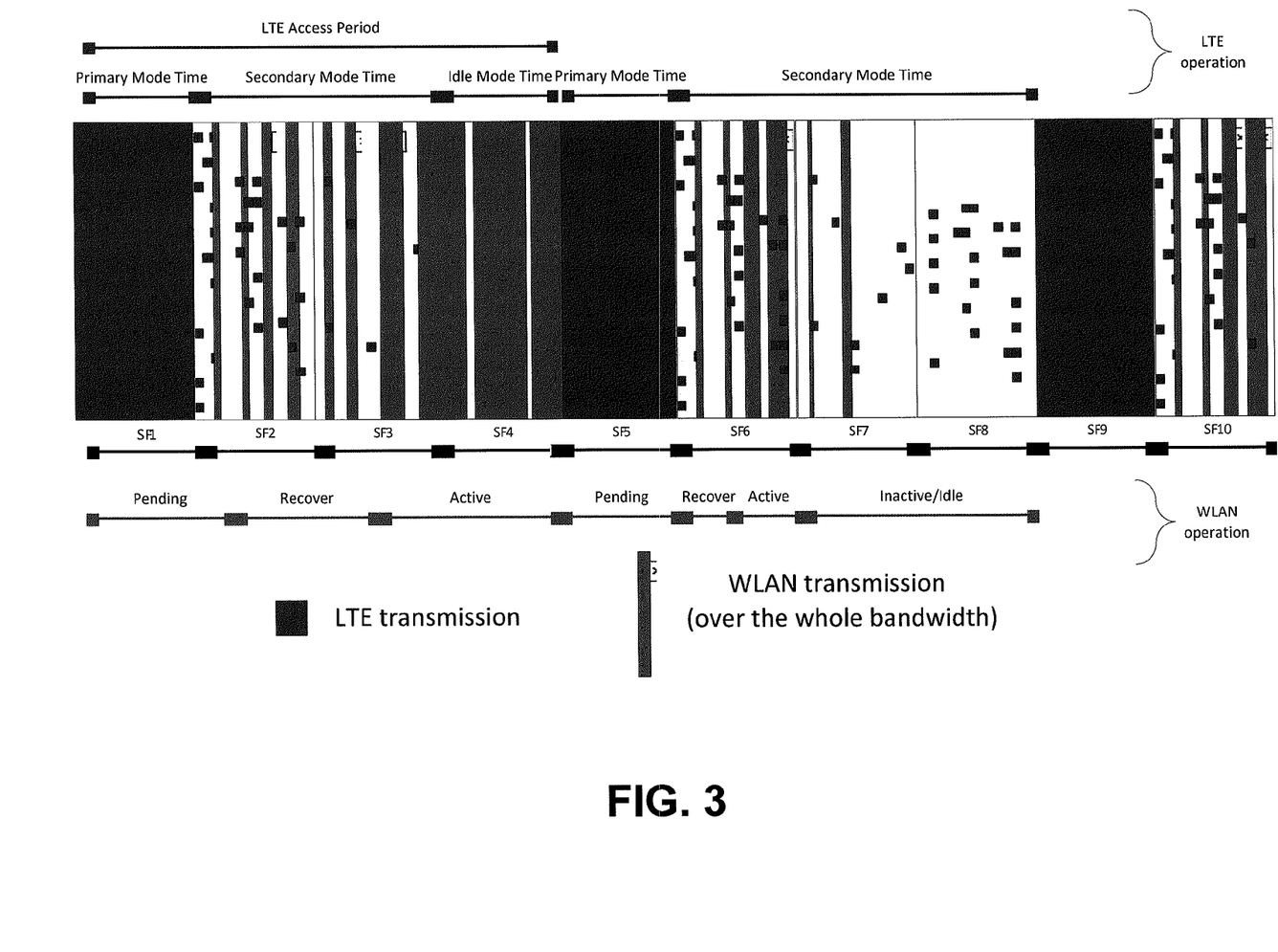
FIG. 3 is an example diagram illustrating cellular and WLAN operations performed in accordance with some example embodiments of the present invention.

FIG. 3 is an example diagram illustrating cellular and WLAN operations performed in accordance with some example embodiments of the present invention. Subframe 1 (SF1) illustrates a primary transmission mode period. As described herein, the mobile terminals, such as mobile terminal 10, (either the primary users or the secondary users) may be scheduled normally without a need for taking into account the effect to WLAN devices. Meanwhile, during the primary transmission mode, the WLAN devices, such as WLAN device 16, may automatically suspend transmission using, for example, using a CSMA/CA mechanism. The primary transmission period for the mobile terminals in turn results in SF1 being a pending period for WLAN devices according to some example embodiments of the current invention.

Subframe 2 and 3 (SF2 and SF3) illustrates a secondary transmission mode. As is described herein and shown the illustrated secondary transmission mode, mobile terminals assigned as primary users, which may classified as the mobile devices causing the ignorable interference to WLAN devices, may be scheduled on the fractional frequency resources (e.g. partial frequency resources). The secondary users that may be causing the high interference to WLAN system would not be scheduled for the transmission on the fractional frequency resources. Secondary devices may monitor the interference on the non-scheduled resources to detect the signal strength of WLAN transmission. Meanwhile, in an instance in which the WLAN system does not detect any strong interference, a suspended WLAN transmission may be recovered, for example WLAN devices may start transmitting.

In subframe 4 (SF4), which illustrates the idle mode, based on the measurement results of the primary user and secondary user, the access point 12 may be configured to detect and derive the activity of a WLAN transmission. In case of strong detected WLAN signals, the access point 12 may further reduce the transmissions by mobile terminals in SF3. Meanwhile, in instances of interference below a threshold from cellular system, WLAN may be configured to be more active on the transmission if there is sufficient data pending for transmission. Thus, for example, SF4 illustrates an active period for WLAN system.

In subframe 5 (SF5), and in an instance in which WLAN is not active or access point 12 didn't detect or receive an indication of the strong interference in the last symbols of SF4, the cellular system may operate normally in the primary transmission mode as the operation in SF1. Consequently, WLAN system would go back to its pending period again. The operation is repeated in a similar manner from SF5 onwards.

Figure 4:
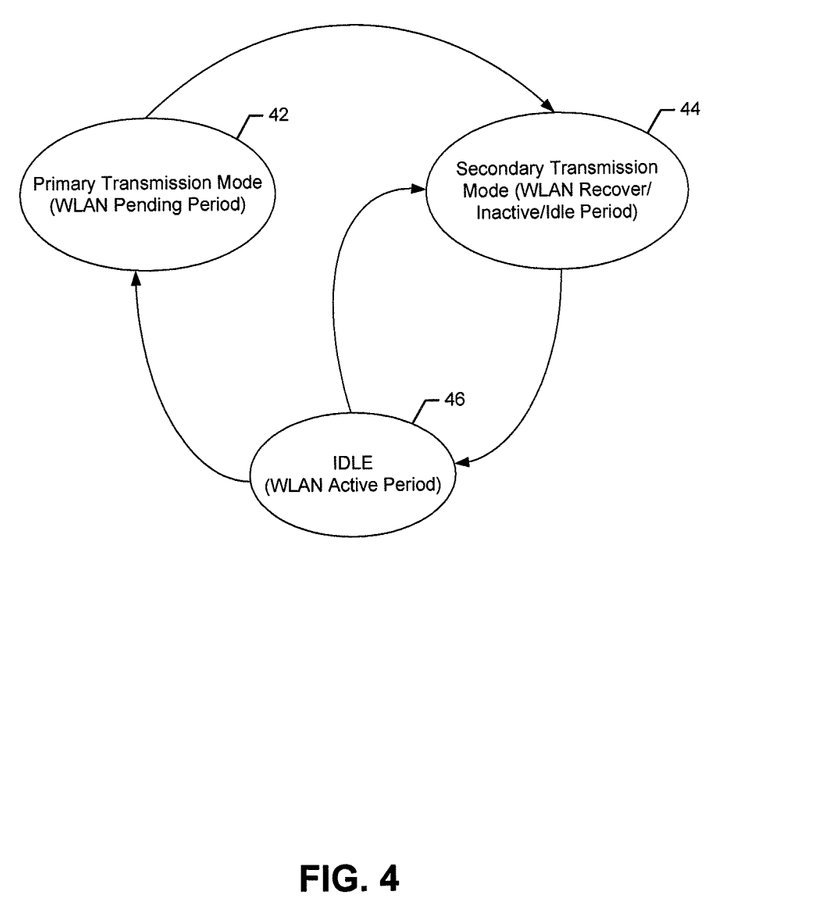
FIG. 4 illustrates an example flow diagram showing several modes of operations in accordance with some example embodiments of the present invention.

FIG. 4 illustrates an example flow diagram showing several modes of operations in accordance with some example embodiments of the present invention. In some example embodiments, the transition between transmission modes may be controlled by a timer. The timer may be operated by the mobile terminal 10, the access point 12, the WLAN device 16 and/or the like. The timer setting may include, for example, a primary transition mode Timer1, primary transition mode Timer2, primary transition mode Timer2 Offset and/or the like. As is shown with respect to operation 42, in an instance in which a primary mode transition time expires, the mobile terminal 10, the access point 12 and/or the like may transition to the secondary transmission mode as shown with respect to operation 44.

As is described herein, during the secondary transmission mode period, interference and activity of WLAN system may be determined by the mobile terminal 10. In an instance in which the quality (e.g. quality of service) on the non-scheduled resource is above a predetermined threshold and/or there is not any detected packet loss on the scheduled resources, the mobile terminal 10, the access point 12 and/or the like may continue to operate in secondary transmission mode. However, in an instance in which the quality is below a predetermined threshold and/or a packet loss is detected, access point 12 may conclude that WLAN is busy and active. Consequently, the mobile terminal 10, the access point 12 and/or the like may transition to IDLE mode as is shown in operation 46.

In idle mode, the mobile terminal 10, the access point 12 and/or the like may monitor whether WLAN is active. If not and in an instance in which the primary transmission mode Timer2 is expired, the mobile terminal 10, the access point 12 and/or the like may transition to a primary transmission mode period. However, if the active WLAN transmission is detected, the mobile terminal 10, the access point 12 and/or the like may extend the idle period operation while adding primary transmission mode Timer2 offset.

Figure 5:
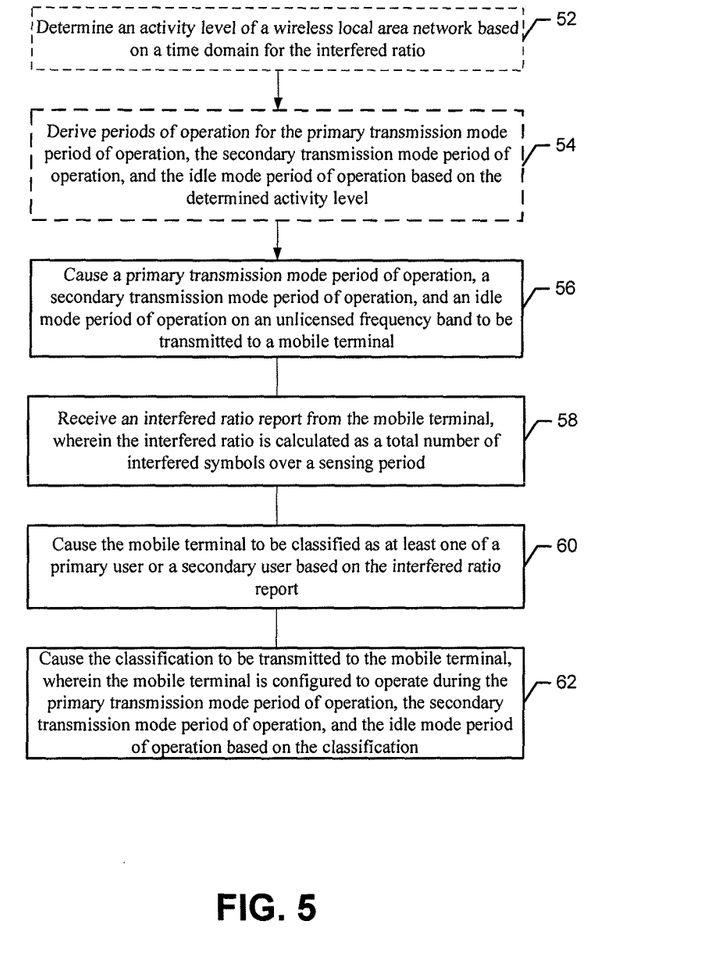
FIGS. 5 and 6 are example flow diagrams illustrating operations performed in accordance with some example embodiments of the present invention.
Figure 6:
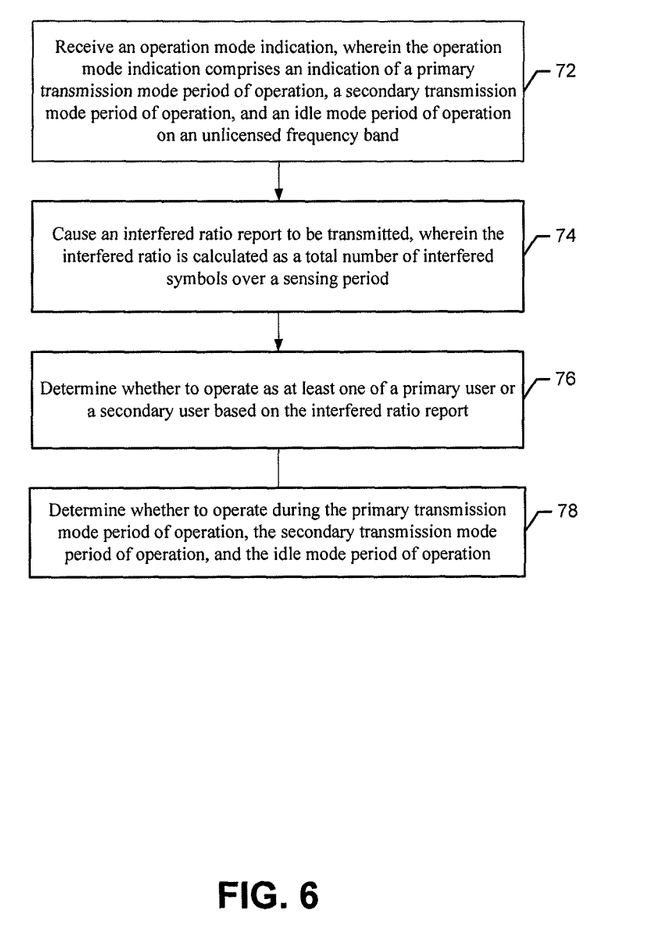

FIGS. 5 and 6 are flowcharts illustrating the operations performed by a method, apparatus and computer program product, such as apparatus 20 of FIG. 2 in accordance with some example embodiments of the present invention are illustrated. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device 28 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 5 and 6, when executed, convert a computer or processing circuitry into a particular machine configured to perform an example embodiment of the present invention. Accordingly, the operations of FIGS. 5 and 6 define an algorithm for configuring a computer or processing circuitry 22, e.g., processor, to perform an example embodiment. In some cases, a general purpose computer may be provided with an instance of the processor which performs the algorithm of FIGS. 5 and 6 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified as described below. Moreover, in some embodiments additional optional operations may also be included (an example of which is shown in dashed lines in FIG. 5). It should be appreciated that each of the modifications, optional additions or amplifications below may be included with the operations above either alone or in combination with any others among the features described herein.

Referring now to FIG. 5, the operations of a method, apparatus and computer program product are configured to enable operation of both cellular and WLAN on a shared unlicensed band. As shown in operation 52, the apparatus 20 that is embodied, for example, by the access point 12 may include means, such as the processing circuitry 22, the processor 24 or the like, for determining an activity level of a wireless local area network based on a time domain for the interfered ratio. As shown in operation 54, the apparatus 20 that is embodied, for example, by the access point 12 may include means, such as the processing circuitry 22, the processor 24 or the like, for deriving periods of operation for the primary transmission mode period of operation, the secondary transmission mode period of operation, and the idle mode period of operation based on the determined activity level.

As shown in operation 56, the apparatus 20 that is embodied, for example, by the access point 12 may include means, such as the processing circuitry 22, the processor 24 or the like, for causing a primary transmission mode period of operation, a secondary transmission mode period of operation, and an idle mode period of operation on an unlicensed frequency band to be transmitted to a mobile terminal. As shown in operation 58, the apparatus 20 that is embodied, for example, by the access point 12 may include means, such as the processing circuitry 22, the processor 24, the communications interface 26 or the like, for receiving an interfered ratio report from the mobile terminal 10, wherein the interfered ratio is calculated as a total number of interfered symbols over a sensing period.

As shown in operation 60, the apparatus 20 that is embodied, for example, by the access point 12 may include means, such as the processing circuitry 22, the processor 24 or the like, for causing the mobile terminal to be classified as at least one of a primary user or a secondary user based on the interfered ratio report. As shown in operation 62, the apparatus 20 that is embodied, for example, by the access point 12 may include means, such as the processing circuitry 22, the processor 24 or the like, for causing the classification to be transmitted to the mobile terminal, wherein the mobile terminal is configured to operate during the primary transmission mode period of operation, the secondary transmission mode period of operation, and the idle mode period of operation based on the classification.

Referring now to FIG. 6, the operations of a method, apparatus and computer program product are configured to enable operation of both cellular and WLAN on a shared unlicensed band. As shown in operation 72, the apparatus 20 that is embodied, for example, by the mobile terminal 10 may include means, such as the processing circuitry 22, the processor 24, the communications interface 26 or the like, for receiving an operation mode indication, wherein the operation mode indication comprises an indication of a primary transmission mode period of operation, a secondary transmission mode period of operation, and an idle mode period of operation on an unlicensed frequency band. As shown in operation 74, the apparatus 20 that is embodied, for example, by the mobile terminal 10 may include means, such as the processing circuitry 22, the processor 24, or the like, for causing an interfered ratio report to be transmitted, wherein the interfered ratio is calculated as a total number of interfered symbols over a sensing period.

As shown in operation 76, the apparatus 20 that is embodied, for example, by the mobile terminal 10 may include means, such as the processing circuitry 22, the processor 24, or the like, for determining whether to operate as at least one of a primary user or a secondary user based on the interfered ratio report. As shown in operation 78, the apparatus 20 that is embodied, for example, by the mobile terminal 10 may include means, such as the processing circuitry 22, the processor 24, or the like, for determining whether to operate during the primary transmission mode period of operation, the secondary transmission mode period of operation, and the idle mode period of operation.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for operating a mobile terminal comprising:
receiving by the mobile terminal an operation mode indication from a network, wherein the operation mode indication comprises an indication of a primary transmission mode period of operation during which the mobile terminal operates without need for interference coordination, by the network with other users operating under the network, on an unlicensed frequency band, a secondary transmission mode period of operation during which the mobile terminal operates on predefined resources on the unlicensed frequency band, and an idle transmission mode period of operation during which the mobile terminal is not allowed to conduct any transmissions on the unlicensed frequency band;
causing an interfered ratio report to be transmitted to the network, wherein the interfered ratio report is calculated as a total number of interfered symbols over a sensing period;
determining whether to operate the mobile terminal as a primary user or a secondary user based on the interfered ratio report, wherein the primary user is configured to operate during the primary transmission mode period of operation and/or during the secondary transmission mode period of operation, and the secondary user is configured to operate during the secondary transmission mode period of operation only; and
determining whether to operate the mobile terminal during the primary transmission mode period of operation, the secondary transmission mode period of operation, or the idle transmission mode period of operation.

2. A method according to claim 1 further comprising:
causing operation during the primary transmission mode period of operation.

3. A method according to claim 1 further comprising:
causing operation during the secondary transmission mode period of operation.

4. A method according to claim 1 further comprising:
causing operation during the idle transmission mode period of operation.

5. A method according to claim 1, further comprising:
causing, when in the primary transmission mode period of operation, a transition to the secondary transmission mode period of operation in an instance in which a primary mode transition timer expires;
causing, when in the idle transmission mode period of operation, a transition to the primary transmission mode period of operation in an instance in which a primary mode transition timer expires and there is no activity detected on a wireless local area network; and
causing, when in the secondary transmission mode period of operation, a transition to the idle transmission mode period of operation in an instance in which at least one of a quality of service is below a predetermined threshold or a packet loss is detected.

6. An apparatus comprising:
at least one processor; and
at least one memory including computer program code, the at least one memory and the computer program code configured to, with the at least one processor, cause the apparatus to at least:
receive by a mobile terminal an operation mode indication from a network, wherein the operation mode indication comprises an indication of a primary transmission mode period of operation during which the mobile terminal operates without need for interference coordination, by the network with other users operating under the network, on an unlicensed frequency band, a secondary transmission mode period of operation during which the mobile terminal operates on predefined resources on the unlicensed frequency band, and an idle transmission mode period of operation during which the mobile terminal is not allowed to conduct any transmissions on the unlicensed frequency band;
cause an interfered ratio report to be transmitted to the network, wherein the interfered ratio report is calculated as a total number of interfered symbols over a sensing period;
determine whether to operate the mobile terminal as a primary user or a secondary user based on the interfered ratio report, wherein the primary user is configured to operate during the primary transmission mode period of operation and/or during the secondary transmission mode period of operation, and the secondary user is configured to operate during the secondary transmission mode period of operation only; and
determine whether to operate during the primary transmission mode period of operation, the secondary transmission mode period of operation, and the idle transmission mode period of operation.

7. An apparatus according to claim 6, wherein the at least one memory including the computer program code is further configured to, with the at least one processor, cause the apparatus to:
cause operation during the primary transmission mode period of operation.

8. An apparatus according to claim 6, wherein the at least one memory including the computer program code is further configured to, with the at least one processor, cause the apparatus to:
cause operation during the secondary transmission mode period of operation.

9. An apparatus according to claim 6, wherein the at least one memory including the computer program code is further configured to, with the at least one processor, cause the apparatus to:

cause operation during the idle transmission mode period of operation.

10. An apparatus according to claim 6, wherein a transition between the primary transmission mode period of operation, the secondary transmission mode period of operation, and the idle transmission mode period of operation is controlled by a timer.

11. An apparatus according to claim 6, wherein the at least one memory including the computer program code is further configured to, with the at least one processor, cause the apparatus to:
cause, when in the primary transmission mode period of operation, a transition to the secondary transmission mode period of operation in an instance in which a primary mode transition timer expires.

12. An apparatus according to claim 6, wherein the at least one memory including the computer program code is further configured to, with the at least one processor, cause the apparatus to:
cause, when in the idle transmission mode period of operation, a transition to the primary transmission mode period of operation in an instance in which a primary mode transition timer expires and there is no activity detected on a wireless local area network; and
cause, when in the secondary transmission mode period of operation, a transition to the idle transmission mode period of operation in an instance in which at least one of a quality of service is below a predetermined threshold or a packet loss is detected.

13. An apparatus comprising:
at least one processor; and
at least one memory including computer program code, the at least one memory and the computer program code configured to, with the at least one processor, cause the apparatus to at least:
cause a primary transmission mode period of operation during which a mobile terminal operates without need for interference coordination, by a network with other users operating under the network, on an unlicensed frequency band, a secondary transmission mode period of operation during which the mobile terminal operates on predefined resources on the unlicensed frequency band, and an idle transmission mode period of operation during which the mobile terminal is not allowed to conduct any transmissions on the unlicensed frequency band to be transmitted to the mobile terminal;
receive an interfered ratio report from the mobile terminal, wherein the interfered ratio report is calculated as a total number of interfered symbols over a sensing period; and
cause the mobile terminal to be classified as a primary user or a secondary user based on the interfered ratio report, wherein the primary user is configured to operate during the primary transmission mode period of operation and/or during the secondary transmission mode period of operation, and the secondary user is configured to operate during the secondary transmission mode period of operation only; and
cause the classification to be transmitted to the mobile terminal, wherein the mobile terminal is configured to operate during the primary transmission mode period of operation, the secondary transmission mode period of operation, and the idle transmission mode period of operation based on the classification.

14. An apparatus according to claim 13, wherein the at least one memory including the computer program code is further configured to, with the at least one processor, cause the apparatus to:
cause the mobile terminal to operate during the primary transmission mode period of operation.

15. An apparatus according to claim 13, wherein the at least one memory including the computer program code is further configured to, with the at least one processor, cause the apparatus to:
cause the mobile terminal to operate during the secondary transmission mode period of operation.

16. An apparatus according to claim 13, wherein the at least one memory including the computer program code is further configured to, with the at least one processor, cause the apparatus to:
receive measurement information from the primary user, wherein the primary user measurement information comprises at least one of block error rate information, interference sensing on a scheduled resource, or passive sensing on an idle resource; and
receive measurement information from the secondary user, wherein the secondary user measurement information comprises interference sensing on the idle resource.

17. An apparatus according to claim 13, wherein the at least one memory including the computer program code is further configured to, with the at least one processor, cause the apparatus to:
cause the mobile terminal to operate during the idle transmission mode period of operation.

18. An apparatus according to claim 13, wherein the at least one memory including the computer program code is further configured to, with the at least one processor, cause the apparatus to:
cause a sensing threshold and an interfered ratio threshold to be transmitted to the mobile terminal, wherein the sensing threshold and the interfered ratio threshold enable the mobile terminal to determine whether it is the primary user or the secondary user.

19. An apparatus according to claim 13, wherein the at least one memory including the computer program code is further configured to, with the at least one processor, cause the apparatus to:
determine an activity level of a wireless local area network based on a time domain for the interfered ratio report; and
derive periods of operation for the primary transmission mode period of operation, the secondary transmission mode period of operation, and the idle transmission mode period of operation based on the activity level.

* * * * *